(12) United States Patent
Kadosh

(10) Patent No.: US 7,650,199 B1
(45) Date of Patent: Jan. 19, 2010

(54) END OF LINE PERFORMANCE PREDICTION

(76) Inventor: Daniel Kadosh, 7103 Spurlock Dr., Austin, TX (US) 78731

( * ) Notice: Subject to any disclaimer, the term of this patent is extended or adjusted under 35 U.S.C. 154(b) by 517 days.

(21) Appl. No.: 11/196,073

(22) Filed: Aug. 3, 2005

(51) Int. Cl.
*G06F 19/00* (2006.01)

(52) U.S. Cl. .......................................... 700/121; 700/98

(58) Field of Classification Search ............. 700/96–99, 700/121, 182, 100, 109, 103–104, 110, 116, 700/219; 706/45; 709/202, 394; 438/5, 438/4
See application file for complete search history.

(56) References Cited

U.S. PATENT DOCUMENTS

| | | | | |
|---|---|---|---|---|
| 4,408,884 A | * | 10/1983 | Kleinknecht et al. | 356/496 |
| 5,801,965 A | * | 9/1998 | Takagi et al. | 702/35 |
| 6,154,711 A | * | 11/2000 | Steffan et al. | 702/82 |
| 6,292,587 B1 | * | 9/2001 | Toho | 382/238 |
| 6,751,519 B1 | * | 6/2004 | Satya et al. | 700/121 |
| 6,947,803 B1 | * | 9/2005 | Bode et al. | 700/121 |
| 2001/0051836 A1 | * | 12/2001 | Lamey et al. | 700/110 |
| 2002/0022937 A1 | * | 2/2002 | Funakoshi | 702/84 |
| 2003/0182252 A1 | * | 9/2003 | Beinglass et al. | 706/45 |
| 2004/0121495 A1 | * | 6/2004 | Sonderman et al. | 438/14 |

OTHER PUBLICATIONS

Guo et al.; An ENF-of—Line SPC Scjeme Using Wafer Acceptance Test Data; Aug. 2002, IEEE, vol. 13, No. 3, p. 344-358.*
Bolt et al., Statistical Parameter Control for Optmum Design and Manufacturablity of VLSI Circuits, 1999, IEEE, p. 99-106.*

* cited by examiner

*Primary Examiner*—Kidest Bahta
(74) *Attorney, Agent, or Firm*—Williams, Morgan & Amerson, P.C.

(57) ABSTRACT

A method, apparatus, and a system for performing post processing modeling is provided. A predicted end of line parameter relating to a workpiece is determined. The predicted end of line parameter is stored. An interface for accessing the end of line parameters provided.

33 Claims, 8 Drawing Sheets

END OF LINE PERFORMANCE PREDICTION

BACKGROUND OF THE INVENTION

1. Field of the Invention

This invention relates generally to semiconductor manufacturing, and more particularly, to a method and apparatus for providing predicted end of line (EOL) data.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a flowchart depiction of an illustrative prior art process flow is provided. A manufacturing system may determine a type of product that is to be manufactured (block 210). This leads to a step of determining process control parameters for processing a batch of semiconductor wafers 105. A predetermined plan for processing wafers to achieve a certain type of result may be determined (block 220). Based upon this processing plan, the manufacturing system directs various factory components to perform a series of processes upon a batch of semiconductor wafers 105 (block 230). A number of control parameters for controlling the processing of wafers 105 are predetermined. These parameters are then used to control various aspects of processing operations, including scheduling, routing, controlling tool operations, etc.

After processing the semiconductor wafer 105, the manufacturing system may acquire data relating to post-process results (block 240). The data relating to post-process results may include yield data, certain performance parameters relating to the completed product, (e.g., access speed, processing speeds, and the like), etc. Based upon this post-process data, process operations performed on subsequent wafers may be adjusted (block 240). Post-process results may provide insight to various adjustments that can be made to improve process operations, such that improved post-process results relating to subsequently processed wafers may be realized.

However, there are problems associated with the state-of-the-art methodology. For example, a significant amount of time may elapse from the start of process operations to the time period when post-process results are acquired. Often, several weeks may elapse before post-process results are available. In the meantime, several process steps may be performed without the benefit of post-process analysis. Thus, any improvements to process operations that may have been made based upon the knowledge derived from analyzing post-process results, may not be realized.

Various components of a manufacturing system, such as a scheduling controller, routing controller, process controller, etc. may benefit from post-process results. However, state-of-the-art process operations generally involve significant lapse of time before corrective data derived from post-process results is available. This may cause errors relating to post process results; errors that otherwise may have been reduced.

The present invention is directed to overcoming, or at least reducing, the effects of one or more of the problems set forth above.

SUMMARY OF THE INVENTION

In one aspect of the present invention, a method is provided for performing post processing modeling is provided. A predicted end of line parameter relating to a workpiece is determined. The predicted end of line parameter is stored. An interface for accessing the end of line parameters provided.

In another aspect of the present invention, a method is provided for performing post processing modeling is provided. A predicted end of line parameter relating to a workpiece is determined. A process step capable of affecting said end of line parameter is identified. The end of line parameter is modeled based upon an analysis of said process step. The parameter is modeled to generate a predicted end of line parameter. The predicted end of line parameter is stored for access.

In another aspect of the present invention, a method is provided for performing post processing modeling is provided. A first process is performed upon a workpiece. Metrology data relating to said workpiece is received. An end of line parameter associated with said workpiece is modeled based upon an analysis of said first process in order to generate a predicted end of line parameter. A routing, scheduling, and a prioritization parameter relating to performing a second process upon said workpiece is determined based upon said predicted end of line parameter.

In another aspect of the present invention, a method is provided for performing post processing modeling is provided. A first process is performed upon a workpiece. A determination is made whether the first process is a critical process. Metrology data relating to said first process based upon said determination that said first process is a critical process. A post process parameter relating to said metrology data is determined. The post process parameter is modeled in order to generate a modeled post process parameter. Access to said modeled post process parameter is provided.

In another aspect of the present invention, a system is provided for performing post processing modeling is provided. The system of the present invention includes a first controller adapted to control a first process and a second process operation performed upon a workpiece. The system also includes a second controller to determine a predicted end of line parameter based upon at least one of said first and second process operations and store said predicted end of line parameter into a database. The second controller is adapted to also perform an adjustment a routing, scheduling, or a prioritization relating to performing a second process upon said workpiece. The system also includes a processing tool operatively coupled with said first controller. The processing tool is adapted to process said workpiece.

In another aspect of the present invention, a apparatus is provided for performing post processing modeling is provided. The apparatus of the present invention includes a controller to determine a predicted end of line parameter based upon a first and a second process operation performed on a workpiece and store said predicted end of line parameter into a database. The controller is also adapted to perform an adjustment of a routing, a scheduling, and a prioritization relating to performing said second process operation upon said workpiece.

In yet another aspect of the present invention, a computer readable program storage device encoded with instructions is provided for performing post processing modeling is provided. The computer readable program storage device encoded with instructions that, when executed by a computer, performs a method, comprising: determining a predicted end of line parameter relating to a workpiece; storing said predicted end of line parameter for access; and providing an interface for accessing said end of line parameters.

BRIEF DESCRIPTION OF THE DRAWINGS

The invention may be understood by reference to the following description taken in conjunction with the accompanying drawings in which like reference numerals identify like elements and in which.

Figure 1:
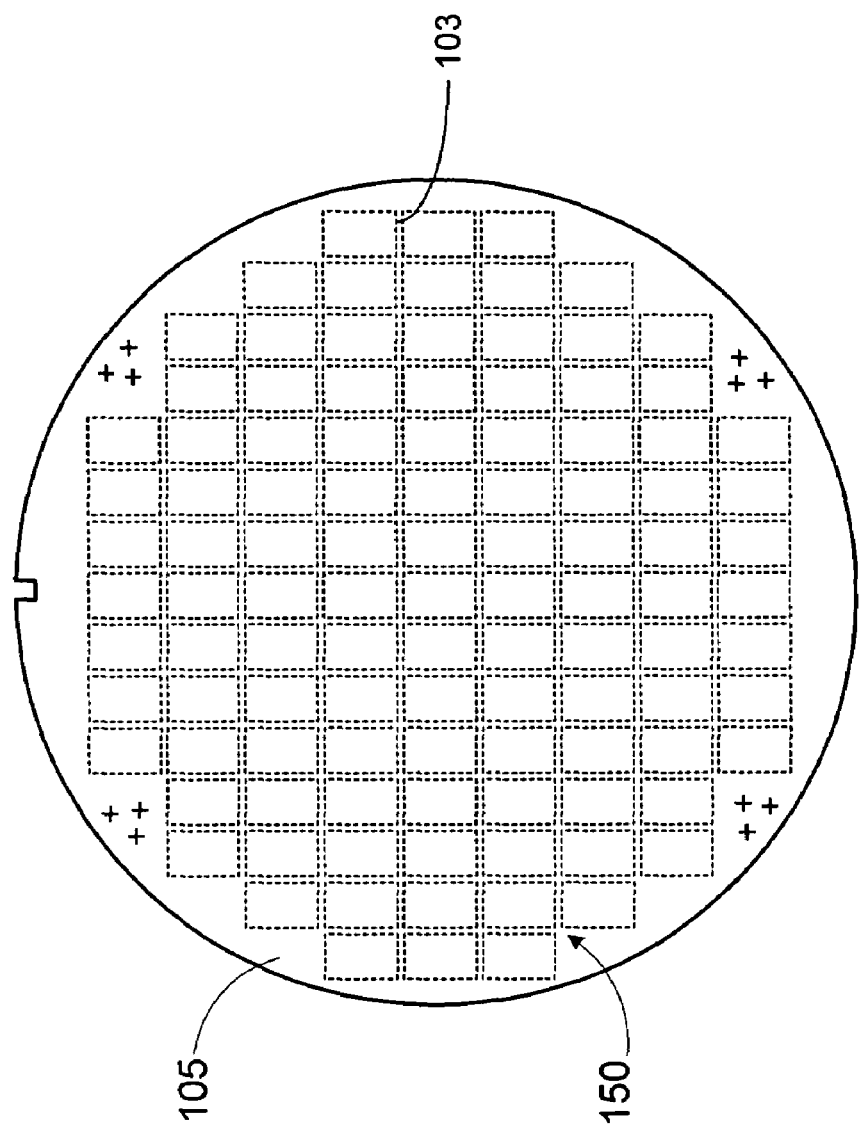
FIG. 1 illustrates a stylized depiction of a semiconductor wafer that may be processed by a semiconductor manufacturing system.
Figure 2:
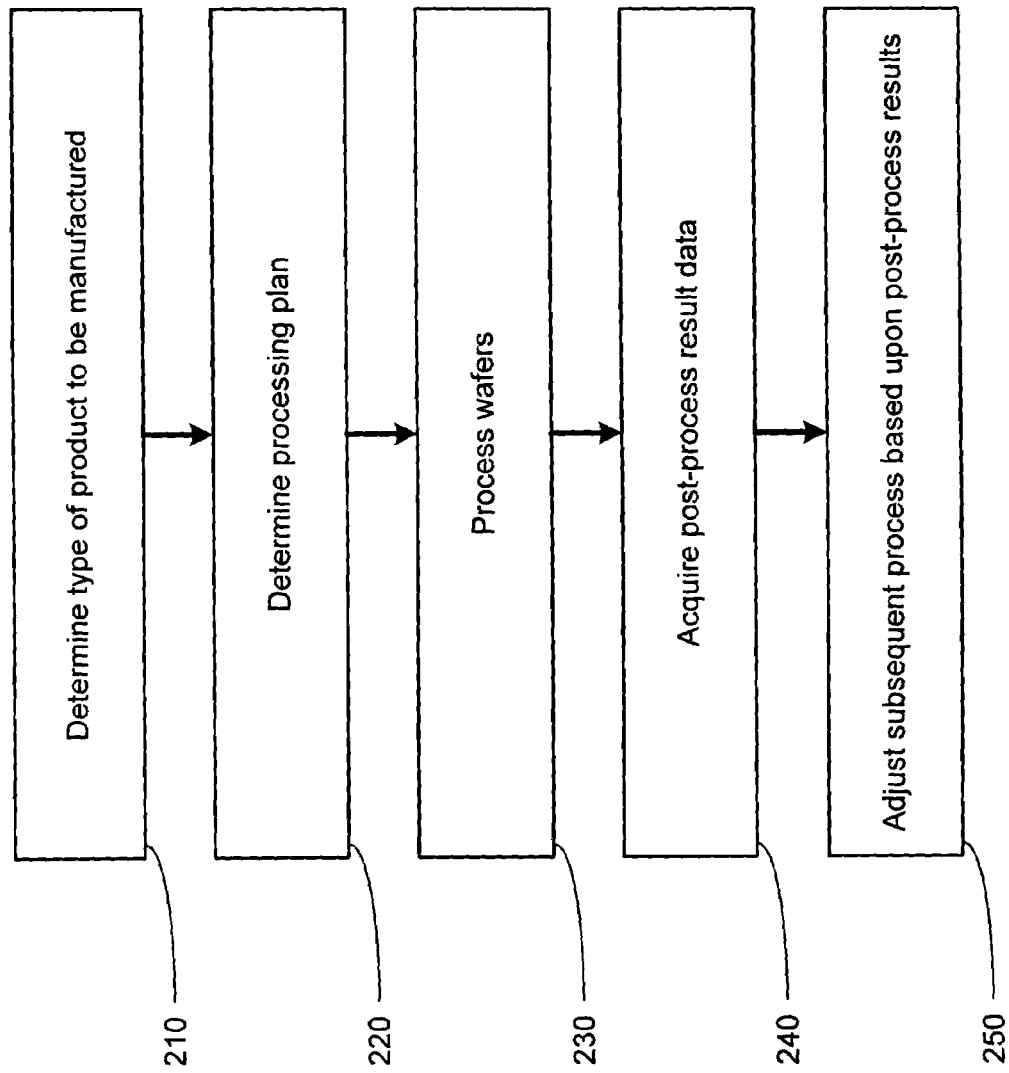
FIG. 2 illustrates a flowchart depiction of a prior art method for processing semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed descriptions are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for identifying various post process parameters and correlating them to inline process steps. This correlation may be used to perform a prediction of potential post process parameters that are likely to occur upon completion of a series of process steps. Certain post process parameter(s) of interest may be specifically identified and directly linked to a particular inline process step. Based upon this correlation, a model may be created to model the potential characteristics of particular key post-process parameters. Data relating to the prediction of the potential process parameters may be stored. Various components of a fab may access the stored model data. For example, various entities, such as a process prioritization system, a scheduling system, a routing system, a remote operator station, etc., associated with various portions of a fab, may access modeled post-process data.

The modeled post-process data may be used to perform more efficient correction and/or adjustment(s) of various processes in a process flow before actual post-process data is acquired. The modeled post-process data may be provided in a variety of formats, such as raw data; organized, correlated and sorted data; graphically illustrated format; table-format data, web-based data (e.g., HTML format); visually represented data, etc. Therefore, manual systems and/or automatic systems may acquire the modeled post-process data and utilize it to perform adjustments of various process steps. Hence, improved yields and post-process performance may be realized by utilizing the embodiments of the present invention.

Figure 3:
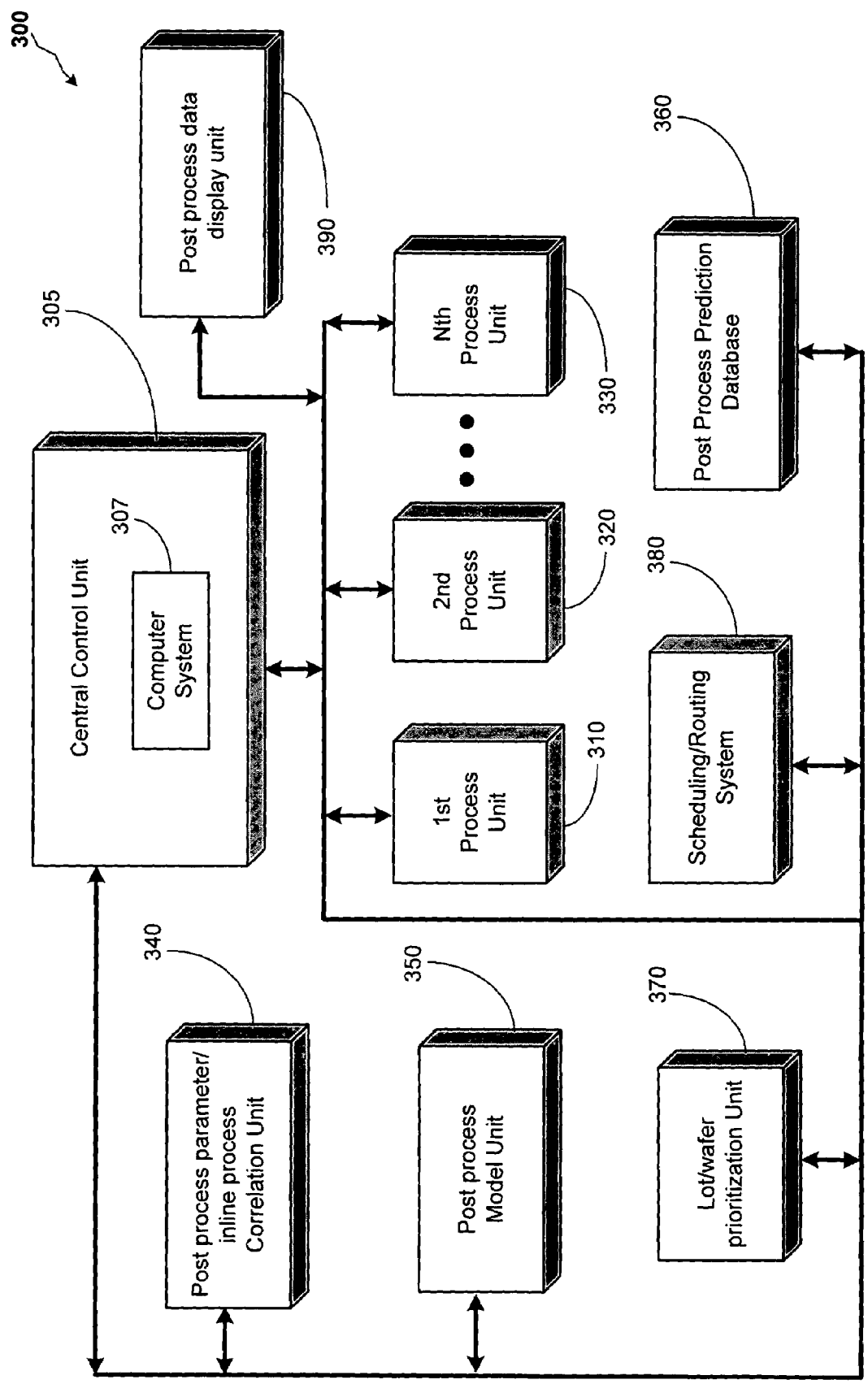
FIG. 3 illustrates a block diagram of a system depicting a central control unit for controlling a plurality of factory components, in accordance with one illustrative embodiment of the present invention.

Turning now to FIG. 3, a block diagram depiction of a system in accordance with an illustrative embodiment of the present invention, is provided. The system 300 comprises a plurality of process units capable of processing semiconductor wafers 105. The system 300 may also comprise a central control unit 305 to control operations performed by various components of the system 300. The central control unit 305 is capable of overseeing and affecting the respective operations of a plurality of process control segments in a factory/fab. For example, a factory may comprise various processing tools that are controlled by one or more tool controllers that may be part of a process unit. The central control unit 305 is capable of receiving and/or generating data and/or instructions to affect the operation of various components of a factory. A computer system 307 associated with the central control system 305 is capable of performing various tasks, such as calculating recipe parameters and generating scheduling/routing and other control parameters to direct the operation of the various components of the system 300.

The system 300 may comprise a $1^{st}$ processing unit 310, a $2^{nd}$ processing unit 320 through an $N^{th}$ processing unit 330 (where N is any integer). The processing units 310-330 provide the system 300 with the capability of performing a series of process steps on wafers process through the manufacturing facility. A more detailed illustration of the process units 310-330 is provided in FIG. 4 and accompanying description below.

The system 300 may also comprise a post-process modeling unit 350. The post-processing modeling unit 350 is capable of modeling one or more post-process or end of line parameters relating to wafers being processed by the process units 310-330. Post-process data may include various characteristics of a semiconductor products that has been processed, include performance (e.g., operation speed, memory capabilities, etc.), as well as other end-of-line characteristics including yield, final wafer electrical test results, etc. The post-process modeling unit 350 may receive metrology data and/or tool state data, along with any actual post-process measurements relating to processed wafers. Tool state data may include, but it not limited to, pressure data relating to a chamber, chamber-temperature, gas flow rate, etc. The post-process modeling unit 350 may perform a modeling or predicting of at least one end of line parameter. The post-process modeling unit 350 may comprise one or more algorithms to generated modeled post-process results. The end of line parameter(s) modeled by the post-process modeling unit 350 may relate to a potential performance parameter or any characteristic associated with a wafers that requires at least one additional process step before completion or processing.

In one embodiment, the post-process modeling unit 350 may be instructed to target certain key post process parameters, such as key EOL electrical parameters. This modeling process may be performed such that the key post process parameters are modeled in connection with metrology data (inline and/or offline data) associated with particular key process steps that affect the post process parameter(s) being modeled. A "key" post process parameter may refer to a post process parameter that is important and/or indicative of the process quality or the operation quality of a processed wafer. For example, during processing a semiconductor wafer 105 that may be used to produce a microcontroller, an exemplary key post-process parameter is speed relating to executing instructions. In one embodiment, after each such key process step, a modeling process may be performed to model an associated key post process parameter. The modeled key post process parameters may be stored into a database (described below). A variety of entities relating to a fab may then access the modeled post process parameter(s).

The system 300 also comprises a post-process parameter/inline process correlation unit 340. The correlation unit 340 is capable of correlating various inline process steps to particular post-process parameters. For example, a polyline that is formed using various process steps, including an etch process, may affect the operating speed of a particular parameter in a processed workpiece. This correlation may be made such that the post-process model unit 350 may use the correlation data to perform the modeling or prediction of various end of line parameters.

Based upon the modeling of various end of line parameters, data relating to such modeling may be stored in a post-process prediction database 360. The post-process prediction database 360 may store data in a variety of formats, such as in raw-data format or processed-data format, e.g., a graphical illustration format, etc. The database 360 may be accessed by a variety of components associated with the fab/factory.

The system 300 may also comprise a lot/wafer prioritization system 370, which may be an entity that may operate independently of other components of the system 300. The lot/wafer prioritization system 370 may prioritize the processing operation of several wafers based upon a variety of factors. These factors may include external factors, such as a market event relating to a particular product that may have caused a sharp increase in the demand for that product, the price of the end product of processing the wafers, etc. Other factors may also include tool capacity, tool health, etc. The lot wafer prioritization system 370 may consider the modeled post process data in the database 360 when performing a prioritization analysis. The post-process or end of line parameter(s) stored in the database 360 may be accessed by the prioritization system 370 in order to perform an analysis of the process priority associated with particular wafers. For example, the modeled post-process parameters may indicate that a particular wafer or a batch of wafers are being processed at a relatively high quality level, e.g., high yield values are associated with the wafers, the wafers are expected to produce high performance devices, etc. This data may be used in the prioritization analysis to further advance the wafer(s) within a process hierarchy or schedule.

The system 300 may also comprise a scheduling/routing system 380. The scheduling/routing system 380 may be an independently operating unit that is capable of performing scheduling and routing functions for directing wafers throughout the various process units 310-330. The scheduling/routing system 380 may also access data from the post-process prediction database 360. The scheduling and the routing of wafers across the system 300 may be based upon various factors such as external requirements, market demand, prices, as well as internal factors. Internal factors that may be considered by the scheduling/routing system 380 may include tool capacity, tool health, etc. Further, the scheduling/routing system 380 may consider predicted end of line parameters, such as potential performance levels of the wafers being currently processed, in order to determine scheduling and routing plans. A feedback system may be provided to modify the routing or scheduling of the wafers based upon the predicted post process data. For example, if the predicted end of line parameter is below a predetermined level of quality, the wafers may be routed to a cleaner processing tool in order to improve the potential performance of the wafers being processed. Alternatively, in light of predicted post-processing data that indicates that the modeled post-process data is below a predetermined threshold, the routing of the associated wafers may be redirected to a rework area or to a lower priority processing area.

The system 300 may also comprises a post process display unit 390 for displaying post process data in a variety of formats. In one embodiment, the post process display unit 390 may be an interface for providing access to modeled post process data. In one embodiment, the post process data may be displayed as a web-based display. As an illustrative example, an operator may be able to view modeled post process data from a remote location by accessing a web-based display using the post process display unit 390. Connections via internal networks (e.g., local area network [LAN], wide-area network [WAN], etc.) and/or external networks (e.g., the Internet) may be used to facilitate access to modeled post process data from a remote location. The post process display unit 390 may comprise a computer, one or more remote and/or local data access devices, display devices, etc.

Various blocks illustrated in FIG. 3 (e.g., the central control unit 305, post-process parameter/inline process correlation unit 340, the post process model unit 350, the scheduling/routing system 380, and/or the lot/wafer prioritization unit 370) may be comprised of software units, firmware units, hardware units, and/or any combination thereof. The various blocks illustrated in FIG. 3 may be interconnected using one or more types of data connection infrastructures, such as a bus connection, wireless connection, etc.

Figure 4:
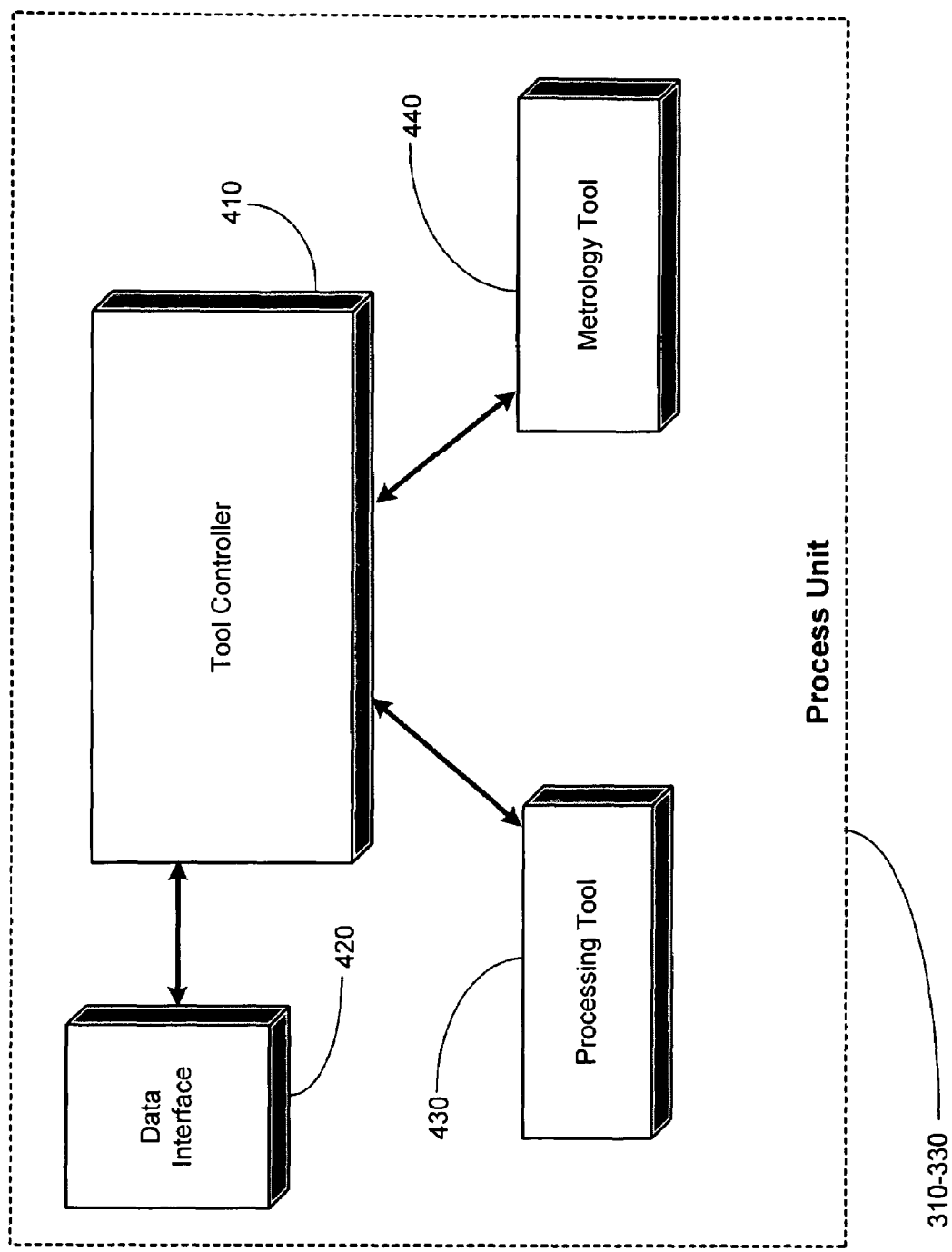
FIG. 4 illustrates a more detailed block diagram depiction of a process unit of FIG. 3, in accordance with one illustrative embodiment of the present invention.

Turning now to FIG. 4, a block diagram depiction of the process units 360-380, in accordance with one embodiment of the present invention, is illustrated. Each of the process units 360-380 may comprise a tool controller 410 that is capable of controlling the operation of a processing tool 430 and/or a metrology tool 440. The processing tool 430 may be an etch tool, a deposition tool, a chemical-mechanical polishing (CMP) tool, a photolithography tool, or any other tool capable of processing semiconductor wafers 105. The metrology tool 440 is capable of acquiring metrology data relating to a processed semiconductor wafer 105. The metrology tool 440 may be a stand-alone tool or it may be integrated within the processing tool 430 itself. A data interface 420 may receive data from, and/or send data to, the central control unit 310. The data received by the data interface 420 may be used to control various components of the process units 360-380, including directing the operation of the processing tool 430 and the metrology tool 440.

The tool controller 410 may receive data from the central control unit 305, which may provide feed-forward and/or feedback control information and/or lot-priority information relating to a particular lot or group of semiconductor wafers 105 that are to be processed. The feed-forward and/or feedback control information and/or lot-priority information relating to a lot of wafers may be based upon a plurality of internal and/or external factors. The feed-forward and/or feedback control information may include process adjustment data and/or tool adjustment data, as well as scheduling and/or routing data. Based upon the data from the central control unit 310, modification of prior scheduling or routing plans may be performed. In response to such modification, the tool controller 410 may perform an assessment of the availability of the processing tool 430 and/or the metrology tool 440. In an alternative embodiment, the tool controller 410 may reside outside the process units 310-330. In this embodiment, the tool controller 410 may direct the operation of various process units 310-330.

Figure 5:
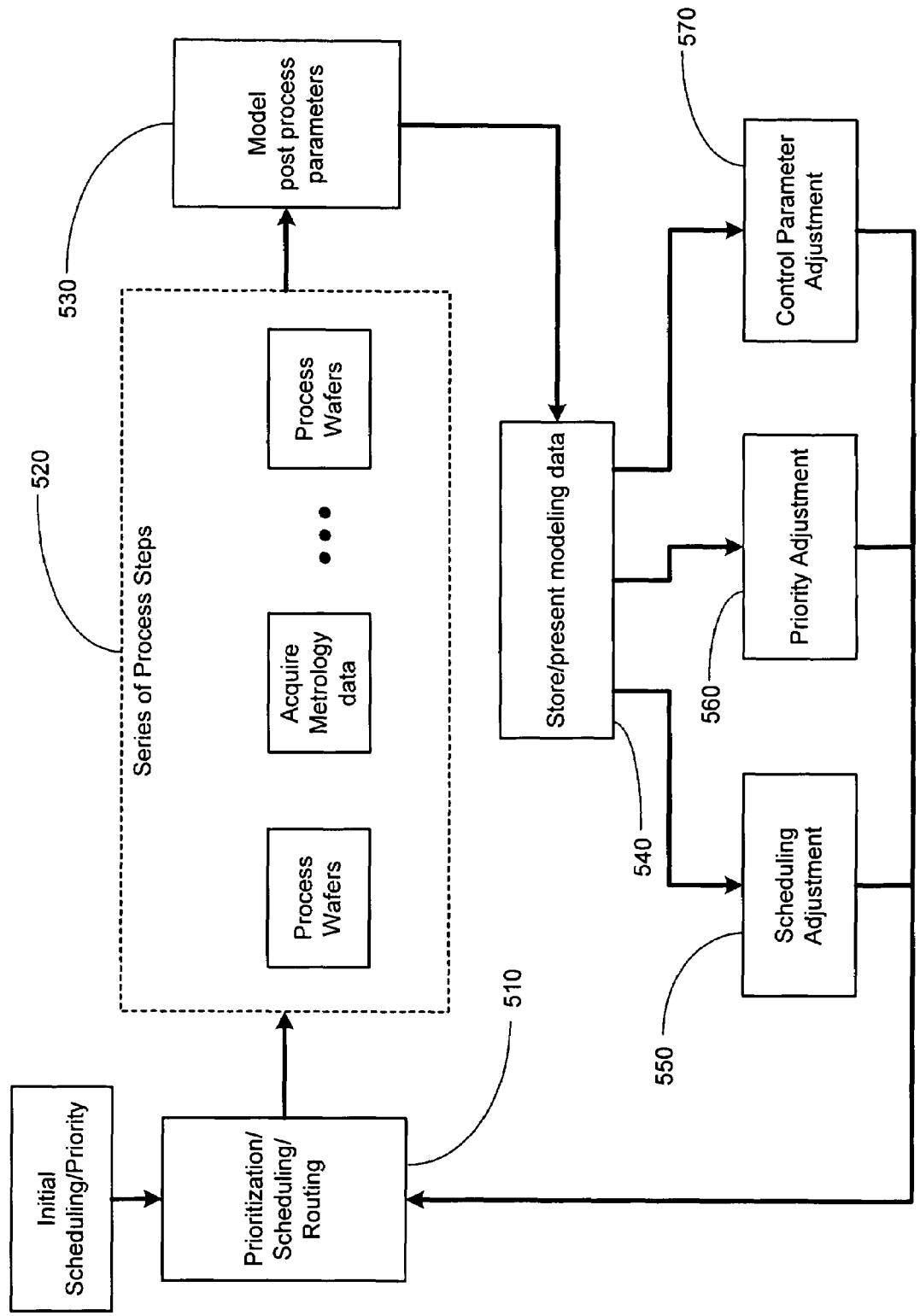
FIG. 5 illustrates a block diagram depiction of a feedback path relating to the operation of the system of FIG. 3, in accordance with one illustrated embodiment of the present invention.

Turning now to FIG. 5, a block diagram depiction of a feedback path in accordance with an illustrative embodiment of the present invention is provided. The system 300 may employ a prioritization scheduling and routing process that may be based upon an initial scheduling and priority configuration, as well as feed-forward and/or feedback data (block 510). Based upon the prioritization, scheduling and routing process, a series of process steps are performed on one or more semiconductor wafers 105 (block 520). The processing of the wafers illustrated in block 520 may encompass various tasks, such as various processing steps, acquisition of metrology data and continuing the processing of the wafers. At various points in the series of processes, a modeling of potential end of line parameters may be performed by the system 300 (block 530). Based upon the modeling of the end of line parameter, the modeled post process data may be stored and/or streamlined at real time (block 540). The data may streamlined in real time to a graphical user interface in a computer system. Therefore, modeled post process parameter(s) may be accessed in a real time fashion, or in an offline manner.

A scheduling adjustment (block 550) may be performed based upon the stored or real time modeling data (block 550). This adjustment may include re-scheduling the original process-related schedule for processing certain wafers. The re-scheduling may include diverting the wafers and scheduling a rework process, holding the wafers until a specific tool becomes available, accelerating processing of the wafers, etc. Further, a priority adjustment relating to the process priority associated with a particular wafer or a batch of wafers, may be adjusted based upon the stored modeling data (block 560). For example, if positive post-process results are predicted, then process priority may be increased for a batch of wafers.

Additionally, various process control parameter adjustments may be performed based upon the stored and/or real time modeling data (block 570). For example, if it appears that the modeled end of line parameter relating to a particular access speed is outside a predetermined threshold range, process adjustments to a subsequent process step may be performed. Based upon the adjustments described in blocks 550, 560 and 570, feedback data may be sent back to the system 300, which may affect the prioritization, scheduling, and/or the routing of the wafers throughout the various components in the system 300.

Figure 6:
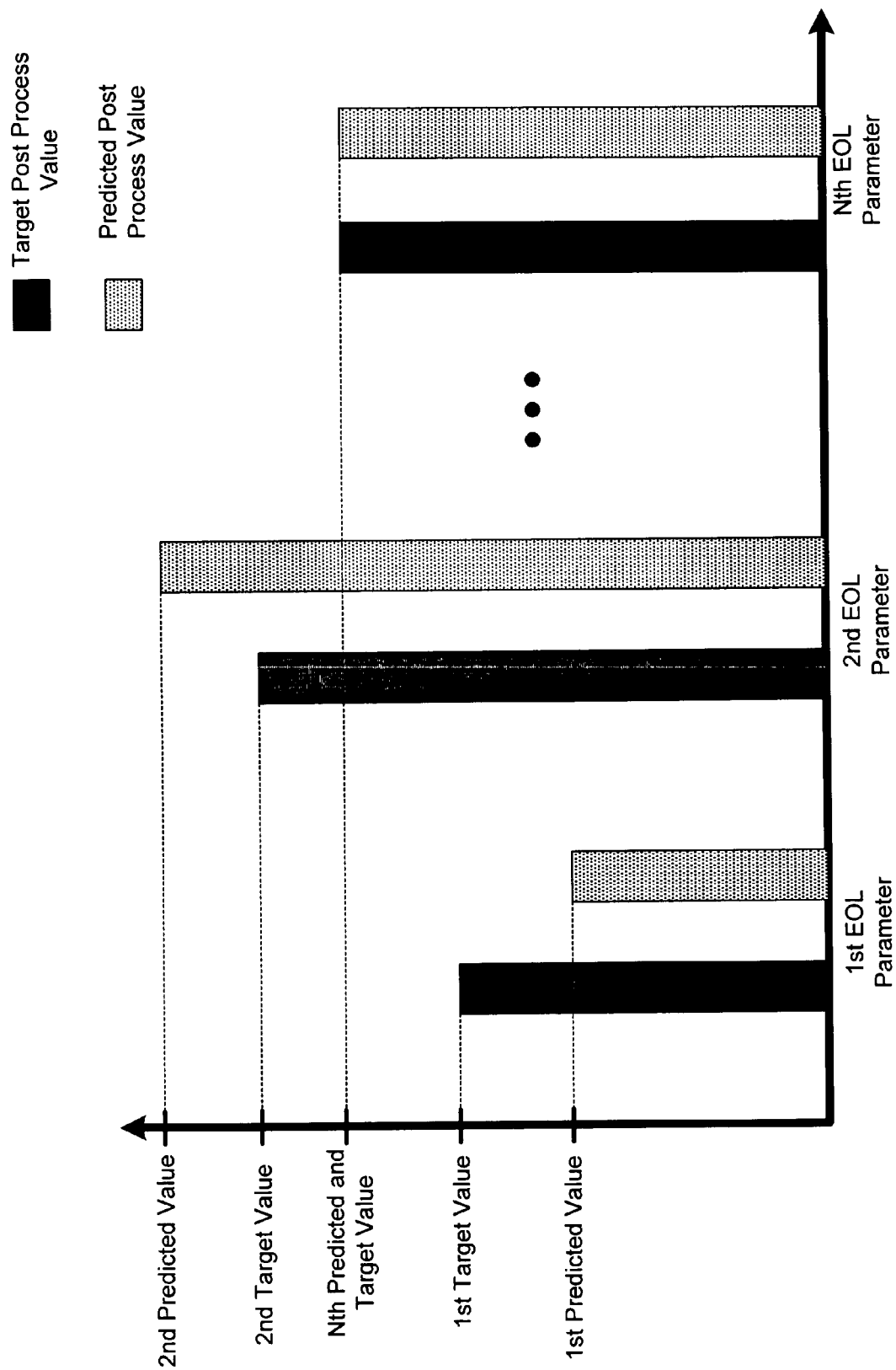
FIG. 6 illustrates an exemplary graphical illustration of target values and predicted values relating to various end of line parameters, in accordance with one illustrated embodiment of the present invention.

The storing and presentation of the modeled data may take on various forms, e.g., graphically illustrated data, such as the example provided in FIG. 6. As indicated in FIG. 6, a $1^{st}$ end of line parameter may be graphed wherein a first target value, which is a predetermined value for a particular end of line parameter, is graphed alongside a predicted EOL value. As illustrated in FIG. 6, the $1^{st}$ predicted end of line parameter value may be slightly lower than a $1^{st}$ target value, which is the desired value. Similarly, the modeled post process parameter value may correspond to the $2^{nd}$ predicted value, which may be greater than a $2^{nd}$ target value. The $2^{nd}$ target value may correspond to the predetermined target range of acceptable values relating to the $2^{nd}$ end of line parameter. Based upon these graphical comparisons, modification to the process scheduling, routing, or process control may be performed.

The graphical illustration may indicate that an $N^{th}$ post-process predicted value may be substantially equal to an $N^{th}$ predicted value. In this case, minimal process or scheduling adjustments may be performed since the predicted end of line parameter is substantially equal to the desired range of values. Various end of line parameters may be analyzed in a similar fashion, wherein various graphical data analysis methods known to those skilled in the art having benefit of the present disclosure, may be used to perform process analysis.

Figure 7:
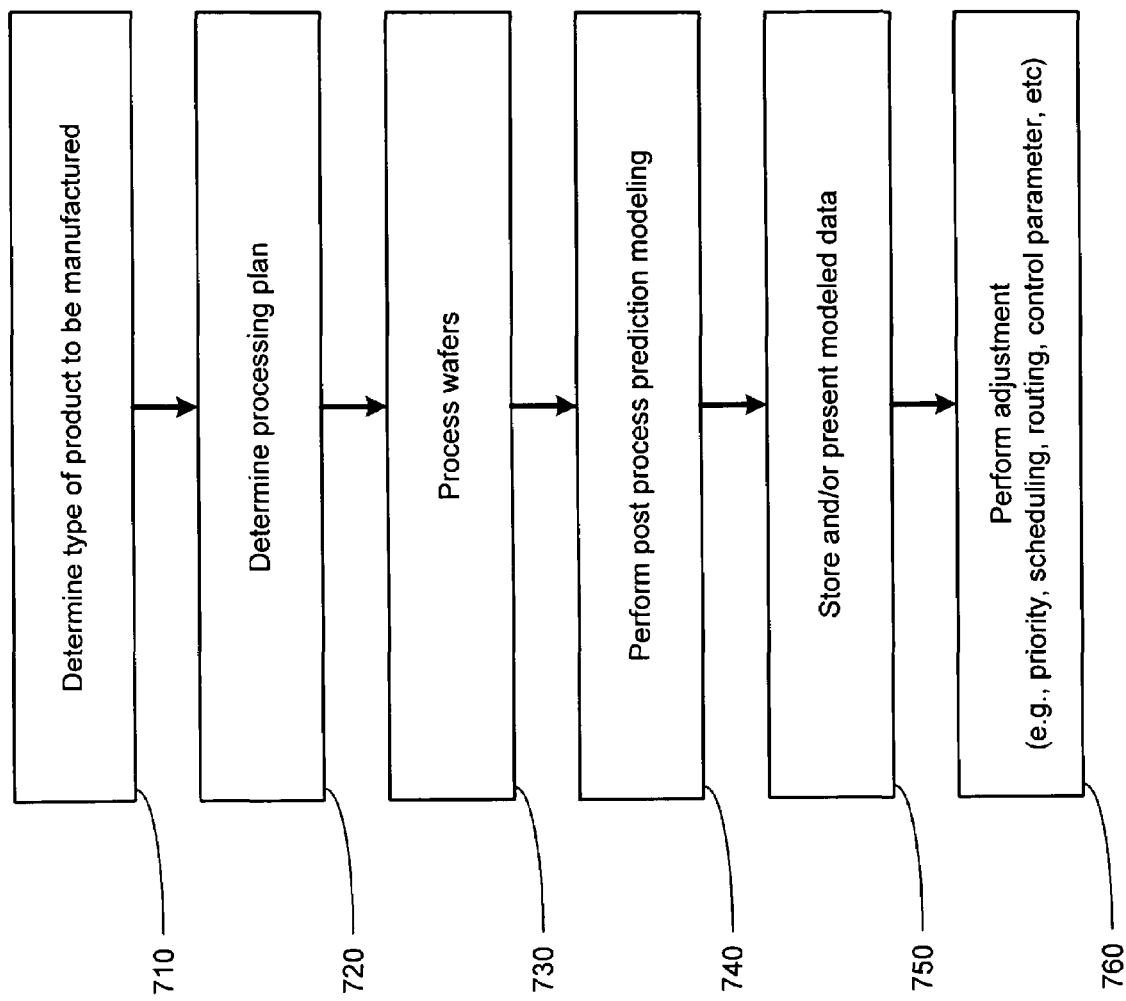
FIG. 7 illustrates a flowchart depiction of steps associated with a method in accordance with one illustrative embodiment of the present invention.

Turning now to FIG. 7, a flowchart depiction of a method, in accordance with an illustrative embodiment of the present invention is provided. The system 300 may determine a type of product that is to be manufactured (block 710). Process control parameters for processing a batch of wafer may be determined. A predetermined plan for processing wafers to achieve a certain type of result may be determined (block 720). Based upon this processing plan, the manufacturing system may direct various factory components to perform a series of processes upon a batch of semiconductor wafers 105 (block 730). A number of control parameters for controlling the processing of wafers 105 may be predetermined. These parameters are then used to control various aspects of processing wafers, including scheduling, routing, controlling tool operations, etc.

Upon performing at least one process operation, a post-process prediction modeling to determine various end of line parameters may be performed (block 740). These end of line parameters may include product or device performance values, such as data-access speed, data-write speed, data-read speed, data-computation speed, switching speed, power consumption, etc. Other factors may include predicted yields, etc. The system 300 may perform the post-process modeling at any given point in the series of process steps. This modeling may provide an indication of predicted EOL parameters that may be expected from a resultant product that is produced as a result of completing a series of process steps. The EOL modeling may be performed at virtually any given point during the operation of the $1^{st}$ through $N^{th}$ process units 310-330.

Based upon the predicted end of line parameters, the system 300 may store the modeling data into a database and/or present the modeled data in a graphical format (block 750). For example, a data access may be set up such that various entities relating to a fab may access the predicted modeling data to perform various tasks, such as modifications relating to scheduling, routing, process control, prioritizing, etc. (block 760).

Figure 8:
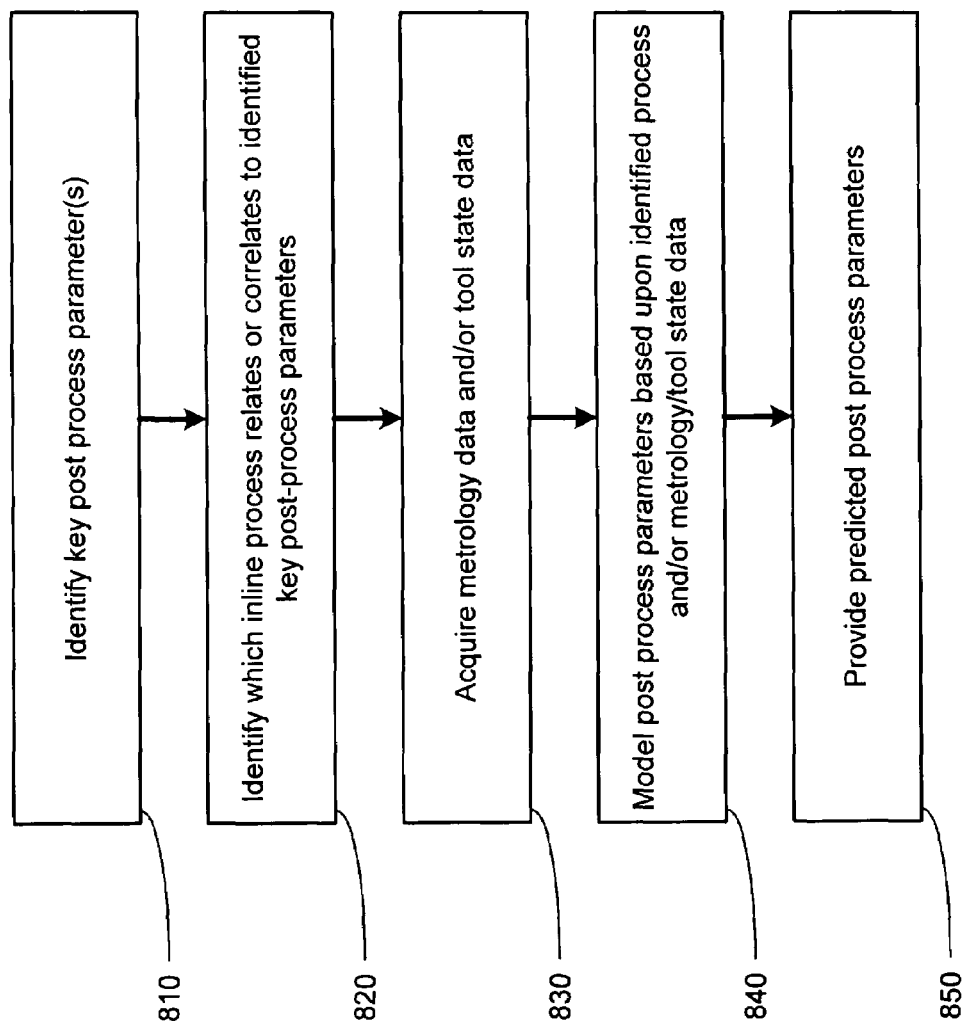
FIG. 8 illustrates a more detailed flow chart depiction of the step of performing a post process prediction modeling process described in FIG. 7, in accordance with an illustrated embodiment of the present invention.

Turning now to FIG. 8, a more detailed flowchart depiction of the steps of performing the post-process prediction modeling of block 730 of FIG. 7, is illustrated. The system 300 may identify key post-process parameter(s) that may be of interest (block 810). This may include various performance end of line parameters, such as operating speed, data access speed, data calculation speed, etc. Furthermore, post-process parameters may also include yield data. The system 300 may also identify particular inline processes that are associated with the identified key post-process parameter(s) (block 820). For example, for parameters relating to certain data access speed, process steps relating to polyline formations may be identified as the correlating inline process. This may include a photolithography process, an etch process, etc.

The system 300 may also acquire metrology and/or tool state data relating to various process steps, particularly from the identified inline processes (block 830). Based upon the identified process steps, metrology data, tool state data, and/or other external inputs, modeling of the post-process parameters may be performed (block 840). Subsequent to modeling post-process parameters, data relating to the modeled parameters may be provided for processing, storing, and/or examining (block 850). Based upon the predicted end of line parameters, various components of the system 300 may use the data to perform adjustments, such as priority, scheduling, routing, and/or control parameter adjustments.

Utilizing embodiments of the present invention, various components of a manufacturing system may use modeled end of line parameters to perform various tasks. Embodiments of the present invention provide for identifying key end of line parameters of interest and correlating them to various inline processes. Based upon such correlation, a modeling of a prediction of the end of line parameters may be performed and stored. The end of line parameters may be stored as raw data, processed data, and/or as a graphical illustration. Therefore, various operators and/or other components relating to a fab may access the predicted data in a manual on in an automated fashion. For example, an operator may access the modeled data using a web-based access system. Based upon this access, various tasks such as scheduling, routing, control adjustments, prioritization, etc., may be performed. Often, various portions of the fab, or even different fabs, may access the end of line modeling data in order to perform process estimation and/or to make adjustments based upon the yield and the quality of expected products.

The principles taught by the present invention can be implemented in an Advanced Process Control (APC) Framework, such as a Catalyst system formerly offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. A method, comprising:
    determining a predicted end of line parameter relating to a workpiece;
    storing said predicted end of line parameter; and
    providing an interface for accessing said predicted end of line parameter; and
    performing at least one of prioritizing a process task to be performed upon said workpiece, scheduling a process step to be performed upon said workpiece, routing said workpiece, or modifying a control parameter of a process step to be performed upon said workpiece, based upon accessing said predicted end of line parameter; and
    processing said workpiece using at least one of the prioritized process task, the scheduled process step, the routing, or the modified control parameter.

2. The method of claim 1, wherein determining a predicted end of line parameter relating to a workpiece comprises determining the predicted end of line parameter relating to a semiconductor wafer.

3. The method of claim 1, wherein determining said predicted end of line parameter relating to said workpiece further comprises:
    identifying an end of line parameter;
    correlating said end of line parameter to a corresponding inline process step;
    acquiring metrology data relating to said inline process step; and
    modeling said end of line parameter based upon said inline process step and said metrology data.

4. The method of claim 1, wherein storing said predicted end of line parameter further comprises storing said predicted end of line parameter into a database.

5. The method of claim 1, wherein storing said predicted end of line parameter further comprises providing data relating to said predicted end of line parameter in a graphical illustrative form.

6. The method of claim 1, further comprising providing a web-based access to data relating to said predicted end of line parameter.

7. The method of claim 1, further comprising providing access to said end of line parameter to at least one of a scheduling system, a routing system, and a prioritization system.

8. The method of claim 1, further comprising processing a subsequent workpiece.

9. A method, comprising:
    determining a predicted end of line parameter relating to a workpiece;
    identifying a process step capable of affecting said predicted end of line parameter;
    modeling said predicted end of line parameter based upon an analysis of said process step, to generate the predicted end of line parameter; and
    storing said predicted end of line parameter for access in a graphically illustrative form.

10. The method of claim 9, wherein storing said predicted end of line parameter comprises providing data relating to said predicted end of line in a graphically illustrative format.

11. The method of claim 9, further comprising processing a subsequent workpiece.

12. A method, comprising:
    performing a first process upon a workpiece;
    receiving metrology data relating to said workpiece;
    modeling an end of line parameter associated with said workpiece based upon an analysis of said first process, to generate a predicted end of line parameter; and
    determining at least one of a routing, scheduling, and a prioritization parameter relating to performing a second process upon said workpiece based upon said predicted end of line parameter.

13. The method of claim 12, further comprising processing a subsequent workpiece.

14. A method, comprising:
  performing a first process upon a workpiece;
  determining if said first process is a critical process;
  acquiring metrology data relating to said first process based upon said determination that said first process is a critical process;
  determining a post process parameter relating to said metrology data; and
  modeling said post process parameter to generate a modeled post process parameter; and
  providing access to said modeled post process parameter.

15. The method of claim 14, further comprising processing a subsequent workpiece.

16. The method of claim 14, wherein providing access to said modeled post process parameter comprises providing remote access to said modeled post process parameter.

17. The method of claim 14, wherein providing access to said modeled post process parameter comprises providing web-based access to said modeled post process parameter.

18. A system, comprising:
  a first controller to control a first process and a second process operation performed upon a workpiece;
  a second controller to determine a predicted end of line parameter based upon at least one of said first and second process operations and store said predicted end of line parameter into a database, the second controller to also perform an adjustment of at least one of a routing, scheduling, and a prioritization relating to performing a second process upon said workpiece; and
  a processing tool operatively coupled with said first controller, said processing tool to process said workpiece.

19. The system of claim 18, further comprising a database to store said predicted end of line parameter.

20. The system of claim 18, further comprising a device to display said predicted end of line parameter in a graphical illustration format.

21. The system of claim 18, wherein said processing tool to process a subsequent workpiece.

22. The system of claim 18, wherein said first controller is a central control unit capable of controlling a plurality of process units, said plurality of process units each comprising at least one processing tool, a metrology tool, and a tool controller for controlling at least one of said processing tool and said metrology tool.

23. The system of claim 18, wherein said workpiece is a semiconductor wafer.

24. An apparatus, comprising:
  a controller to determine a predicted end of line parameter based upon at least one of a first and a second process operation performed on a workpiece and store said predicted end of line parameter into a database, the controller to also perform an adjustment of at least one of a routing, a scheduling, and a prioritization relating to performing said second process operation upon said workpiece.

25. The apparatus of claim 24, wherein said workpiece is a semiconductor wafer.

26. The apparatus of claim 24, wherein controller is capable of providing said end of line parameter in a graphical illustrative format.

27. An apparatus, comprising:
  means for determining a predicted end of line parameter relating to a workpiece;
  means for storing said predicted end of line parameter for access; and
  means for providing an interface for accessing said predicted end of line parameter; and
  means for performing at least one of a prioritization of process task, a scheduling of a process step to be performed upon said workpiece, a routing of said workpiece, or modifying a control parameter for performing a process step upon said workpiece, based upon accessing said predicted end of line parameter.

28. A computer readable program storage device encoded with instructions that, when executed by a computer, performs a method, comprising:
  determining a predicted end of line parameter relating to a workpiece;
  storing said predicted end of line parameter for access; and
  providing an interface for accessing said predicted end of line parameter.

29. The computer readable program storage device encoded with instructions that, when executed by a computer, performs the method of claim 28, further comprising accessing said predicted end of line parameter to perform at least one of a prioritization of process task, scheduling of a process step to be performed upon said workpiece, routing of said workpiece, and modifying a control parameter for performing a process step upon said workpiece.

30. The computer readable program storage device encoded with instructions that, when executed by a computer, performs the method of claim 28, wherein determining said predicted end of line parameter relating to said workpiece further comprises:
  identifying an end of line parameter;
  correlating said end of line parameter to a corresponding inline process step;
  acquiring metrology data relating to said inline process step; and
  modeling said end of line parameter based upon said inline process step and said metrology data.

31. The computer readable program storage device encoded with instructions that, when executed by a computer, performs the method of claim 28, wherein storing said predicted end of line parameter further comprises storing said predicted end of line parameter into a database.

32. The computer readable program storage device encoded with instructions that, when executed by a computer, performs the method of claim 28, further comprising providing access to said end of line parameter to at least one of a scheduling system, a routing system, and a prioritization system.

33. The computer readable program storage device encoded with instructions that, when executed by a computer, performs the method of claim 28, further comprising processing a subsequent workpiece.

* * * * *